United States Patent
Lao et al.

(10) Patent No.: US 11,303,121 B2
(45) Date of Patent: *Apr. 12, 2022

(54) MODULAR DIRECT CURRENT (DC) ARCHITECTURES

(71) Applicant: Google LLC, Mountain View, CA (US)

(72) Inventors: Eduardo Lao, Fremont, CA (US); Jyoti Sastry, Santa Clara, CA (US); James Kennedy, San Jose, CA (US); Christopher Gregory Malone, Mountain View, CA (US); Varun Sakalkar, San Carlos, CA (US)

(73) Assignee: Google LLC, Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/806,637

(22) Filed: Mar. 2, 2020

(65) Prior Publication Data

US 2020/0203948 A1 Jun. 25, 2020

Related U.S. Application Data

(62) Division of application No. 15/385,365, filed on Dec. 20, 2016, now Pat. No. 10,587,115.

(51) Int. Cl.
*H02J 1/00* (2006.01)
*H02M 7/04* (2006.01)
(Continued)

(52) U.S. Cl.
CPC .............. *H02J 1/00* (2013.01); *H02J 3/04* (2013.01); *H02J 3/38* (2013.01); *H02J 5/00* (2013.01); *H02M 7/04* (2013.01)

(58) Field of Classification Search
CPC ........................................................ H02J 1/00
(Continued)

(56) References Cited

U.S. PATENT DOCUMENTS 7,633,181 B2 12/2009 Gross et al.
9,263,895 B2 * 2/2016 Naiknaware ............ H02M 7/44
(Continued)

FOREIGN PATENT DOCUMENTS

WO WO 2012/156078 11/2012
WO WO 2014/026840 2/2014
WO WO 2016/131460 8/2016

OTHER PUBLICATIONS

'electrical4u.com' [online]. "Electrical Power Distribution System," 2016, [retrieved on Dec. 19, 2016], Retrieved from the Internet: URL<h~://www.electrical4u.com/electrical-power-distribution-system-radial-ring-main-electrical-power-distribution-system/> 8 pages.

(Continued)

*Primary Examiner* — Joseph Chang
(74) *Attorney, Agent, or Firm* — Fish & Richardson P.C.

(57) ABSTRACT

This specification describes a power distribution system comprising a first section that receives power from a first source. The power at the first section is adjusted by a rectifier coupled to a power bus of the first section. The system includes a second section that is separate from the first section and that receives power from a second source. The power at the second section is adjusted by a rectifier coupled to a power bus of the second distribution section. The system includes a swing rectifier connected to each of the first and second sections. The swing rectifier is configured to provide power to the first power bus and to the second power bus and to dynamically adjust the power capacity of the first section that is available to computing loads, and to dynamically adjust the power capacity of the second section that is available to computing loads.

20 Claims, 4 Drawing Sheets

(51) Int. Cl.
*H02J 3/04* (2006.01)
*H02J 5/00* (2016.01)
*H02J 3/38* (2006.01)

(58) Field of Classification Search
USPC .......................................................... 307/24
See application file for complete search history.

(56) References Cited

U.S. PATENT DOCUMENTS

| | | | |
|---|---|---|---|
| 10,587,115 B2* | 3/2020 | Lao .......................... | H02J 3/04 |
| 2009/0133733 A1 | 5/2009 | Retti | |
| 2010/0156354 A1 | 6/2010 | Nielsen | |
| 2011/0177954 A1 | 7/2011 | Gamble | |
| 2011/0191773 A1 | 8/2011 | Pavel et al. | |
| 2012/0232728 A1* | 9/2012 | Karimi ...................... | H02J 3/38 |
| | | | 701/22 |
| 2014/0240880 A1 | 8/2014 | Chen | |
| 2015/0183385 A1 | 7/2015 | Iwashinna | |
| 2016/0294214 A1 | 10/2016 | Mosman | |

OTHER PUBLICATIONS

'wikipedia.com' [online]. "Traction power network," Apr. 2016, [retrieved on Dec. 19, 2016], Retrieved from the Internet: URL<https://en.wikipedia.org/wiki/Traction_power_network> 5 pages.
International Preliminary Report on Patentability issued in International Application No. PCT/US2017/050016, dated Nov. 16, 2018, 17 pages.
International Search Report and Written Opinion issued in International Application No. PCT/US2017/050016, dated Oct. 18, 2017, 13 pages.
Jonsson et al. "Power upgrade of Isal Potlines 1-3," International Aluminum Journal, 2013, 6 pages.
Murill et al. "Evaluating the Opportunity for DC Power in the Data Center," Emerson Network Power Energy Systems, 2010, 10 pages.
EP Office Action in European Application No. 20153905.3, dated Apr. 23, 2020, 9 pages.

* cited by examiner

FIG. 2

MODULAR DIRECT CURRENT (DC) ARCHITECTURES

CROSS REFERENCE TO RELATED APPLICATION

This application is a continuation application of U.S. application Ser. No. 15/385,365, filed Dec. 20, 2016, which is incorporated by reference.

BACKGROUND

Contemporary power distribution architectures are typically radial and primarily employ Alternating Current (AC) based power distribution methods. These distribution schemes do not provide sufficiently modular, scalable, or cost effective electrical distribution solutions for data centers and other related facilities that include multiple information processing systems (i.e., multiple loads).

SUMMARY

The present specification is related to modular power distribution architectures for supplying direct current to multiple loads at a given location.

A variety of DC architectures are described that provide scalable DC power distribution in a modular framework. Moreover, the power architectures can be adapted based on unique energy demands of different information processing facilities. This specification proposes a system that leverages and incorporates existing technologies from alternate industries to produce low cost and scalable power supply solutions. The modular and scalable features of the described DC architectures will enable deployment of power solutions that use smaller footprints, while enabling pooling of power to more effectively utilize resources. Additionally, use of the DC distribution systems described in this specification aids in successfully leveraging technologies which are germane in alternate industries to enhance power distribution in the data center application space.

In one innovative aspect, a power distribution system is described and includes, a first distribution section that receives power from at least one power source, wherein a characteristic of the received power is adjusted by a first rectifier unit coupled to a first power bus of the first distribution section. The power distribution system includes a second distribution section that is separate from the first distribution section and that receives power from at least one power source, wherein a characteristic of the received power is adjusted by a second rectifier unit coupled to a second power bus of the second distribution section. The power distribution system further includes a first swing rectifier connected to the first distribution section and connected to the second distribution section, the first swing rectifier configured to provide power to the first power bus and to provide power to the second power bus, wherein the first swing rectifier dynamically adjusts the power capacity of the first distribution section that is available to one or more loads, and dynamically adjust the power capacity of the second distribution section that is available to one or more loads.

In some implementations, the power distribution system further includes a first switch breaker unit associated with the first power bus and disposed in the first distribution section and a second switch breaker unit associated with the second power bus and disposed in the second distribution section, wherein the first and second switch breaker units each include a power rating that is indicative of a total power output of the respective first and second distribution sections.

In some implementations, the first swing rectifier is coupled to the first and second switch breaker units to increase an availability of power that can be provided from the first power bus to the one or more loads and to increase an availability of power that can be provided from the second power bus to the one or more loads. In some implementations, the at least one power source of the first distribution section and the at least one power source of the second distribution section are the same power source.

In some implementations, the first distribution section further includes at least one additional rectifier unit that cooperates with the first rectifier unit to form a ring bus architecture for the first power bus, and wherein the ring bus receives adjusted power from the rectifier units for distribution to the one or more loads. In some implementations, the second distribution section further includes at least one additional rectifier unit that cooperates with the second rectifier unit to form a ring bus architecture for the second power bus, and wherein the ring bus receives adjusted power from the rectifier units for distribution to the one or more loads.

In some implementations, the first distribution section and second distribution section are arranged in a radial power distribution architecture to provide power to a plurality of devices disposed within a data center facility. In some implementations, the first distribution section and second distribution section are arranged in a radial power distribution architecture that can be expanded to include one or more additional distribution sections and one or more additional swing rectifiers. In some implementations, the system further includes a third distribution section and a second swing rectifier that is connected to the second and third distribution sections.

In another innovative aspect, an electronic system is described and includes at least one control device including one or more processing devices; one or more machine-readable storage devices for storing instructions that are executable by the one or more processing devices to perform operations comprising: monitoring power received by a first distribution section, from at least one power source, wherein a characteristic of the received power is adjusted by a first rectifier unit coupled to a first power bus of the first distribution section. The operations include monitoring power received by a second distribution section from at least one power source, the second distribution system being separate from the first distribution section, and wherein a characteristic of the received power is adjusted by a second rectifier unit coupled to a second power bus of the second distribution section. The operations further include enabling, by a first swing rectifier connected to the first distribution section and connected to the second distribution section, dynamic adjustment of the power capacity of the first distribution section that is available to one or more loads and dynamic adjustment of the power capacity of the second distribution section that is available to one or more loads.

In some implementations, enabling dynamic adjustment of power includes using the first swing rectifier to provide power to the first power bus in response to a demand for power exceeding a threshold demand, and using the first swing rectifier to provide power to the second power bus in response to the demand for power exceeding a threshold demand. In some implementations, the system further includes a first switch breaker unit associated with the first power bus and disposed in the first distribution section and a second switch breaker unit associated with the second power bus and disposed in the second distribution section, wherein the first and second switch breaker units each include a power rating that is indicative of a total power output of the respective first and second distribution sections.

In some implementations, operations performed by the one or more processing devices further include: increasing the availability of power that can be provided to the one or more loads in response to engaging a swing function of the first swing rectifier, wherein the first swing rectifier is coupled to the first and second switch breaker units to enable the provision of available power from the first power bus and from the second power bus. In some implementations, the first distribution section further includes at least one additional rectifier unit that cooperates with the first rectifier unit to form a ring bus architecture for the first power bus, and wherein operations performed by the one or more processing devices further include: monitoring adjusted power received by the ring bus from the rectifier units and providing a control signal to cause the distribution of adjusted power to the one or more loads.

In some implementations, the second distribution section further includes at least one additional rectifier unit that cooperates with the second rectifier unit to form a ring bus architecture for the second power bus, and wherein operations performed by the one or more processing devices further include: monitoring adjusted power received by the ring bus from the rectifier units and providing a control signal to cause the distribution of adjusted power to the one or more loads. In some implementations, the first distribution section and second distribution section are arranged in a radial power distribution architecture to provide power to a plurality of devices disposed within a data center facility.

The subject matter described in this specification can be implemented in particular implementations and can result in one or more of the following advantages. DC power distribution architectures are provided which are modular and scalable and that utilize interconnections of multiple rings to enable scaling of the architecture. Modularity is accomplished based on configurable connections that exist between various sections of the architecture. For example, the architecture can include a multiple ring bus arrangement in which rings are interconnected through a swing rectifier device to facilitate power sharing between one or more rings/sections of the architecture. The swing rectifier can be shared between multiple ring buses and facilitates dynamic upscaling of available DC based power that can be supplied by the distribution system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example open ring radial DC distribution architecture including a swing rectifier intermediate a first section and a second section.

Like reference numbers and designations in the various drawings indicate like elements.

DETAILED DESCRIPTION

Figure 1A:
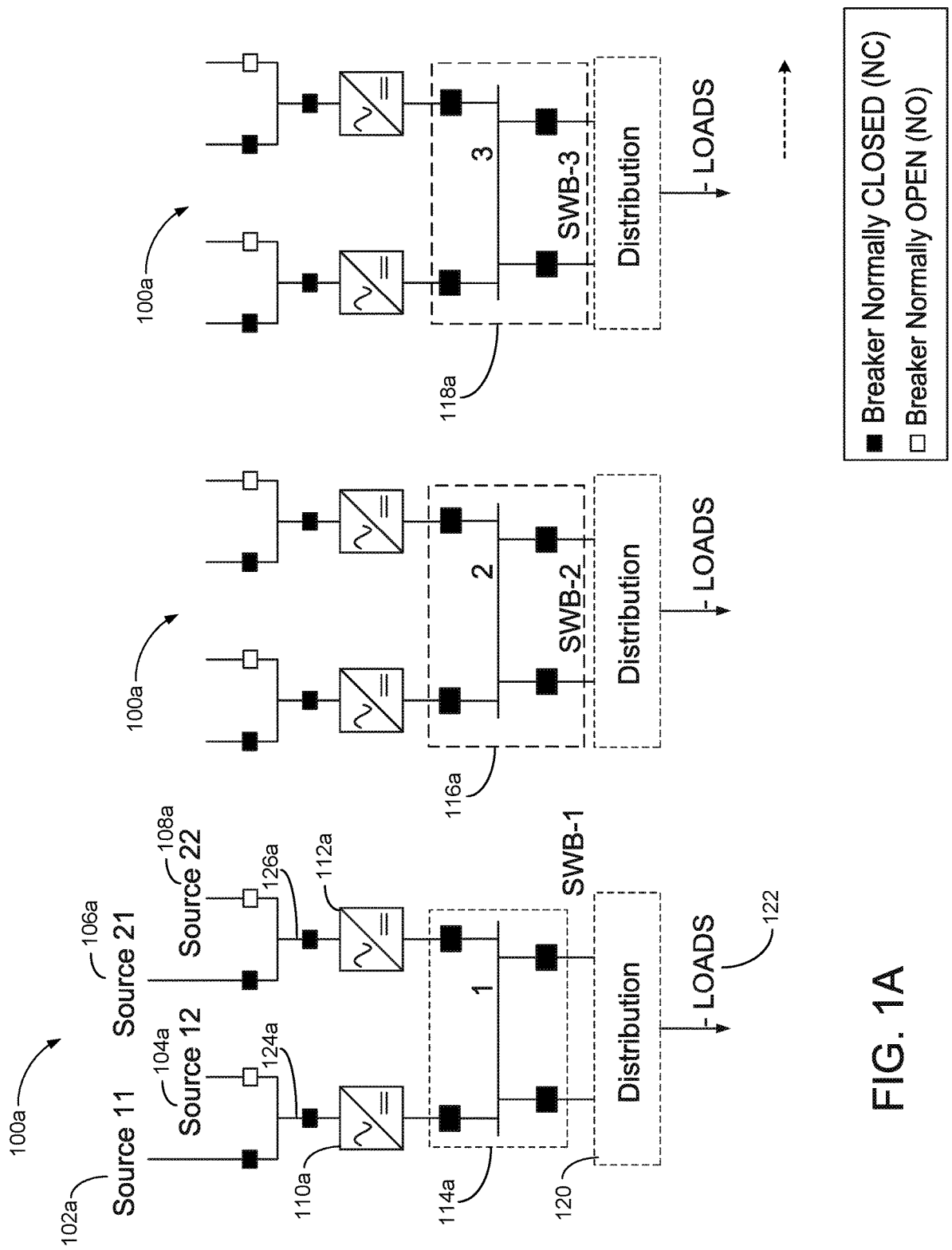
FIGS. 1A and 1B illustrate example open ring radial DC distribution architectures.

Radial and ring based DC power distribution architectures are described that include functionality and features which enable building out of the architecture through the use of modules or sections. Power (voltage and current) supply sources can be connected to power attribute adjustment devices such as a transformer and rectifier set. The architecture enables multiple power supply source types to be connected to, and ultimately provide power to, a variety of information computing systems such as systems used in data centers or information technology (IT) facilities.

Example implementations described in this written description enable power availability that can be supplied to additional loads based, in part, on a section of the distribution architecture being dual fed from the multiple power source types. Supplied DC power can be un-stranded, e.g., upscaled as needed, through oversizing of the components within a section to withstand increases in the available power that can be output for a particular section. A ring bus architecture can be configured to include multiple ring buses that supply current to operations that require enhanced reliability relative to radial distribution architectures.

For a given section distribution section, concurrently maintaining available power output of the section is achievable through use of one or more rectifiers per group of loads that are supported powered by the section. Moreover, redundancy is built into the DC distribution architecture through the use of multiple rectifier units per section. Hence, multiple power supply sources can be connected to, and integrated at, each section. Power supply sources can include AC power supplied by a conventional large-scale generating station or supply sources that are provided by back-up power devices such as diesel generators, batteries or other uninterruptible power supplies connected each section. As described in more detail below, FIG. 1A/1B and FIG. 2 each describe example radial distribution architectures, while FIG. 3 describes an example ring distribution architecture (described below).

For radial distribution systems at a given location or facility, independent supply sources (e.g., section 100a) branch out to several distribution points 120 with no (or few) intermediate connections between distinct supply sources (e.g., between the different sections 100a). Radial power distribution systems are frequently used because the systems employ a simplistic design that is inexpensive to arrange and construct. In radial systems, operation and expansion are simple but reliability is limited.

For example, certain faults, including loss of conductor cable, primary supply, or transformer device, can result in outage for all loads 122 (e.g., information/computing systems or racks) served by supply source/section 100a. Furthermore, electrical power to loads 122 can be interrupted when any hardware items associated with a particular section 100a must be de-energized to perform routine maintenance or service actions.

Figure 1B:
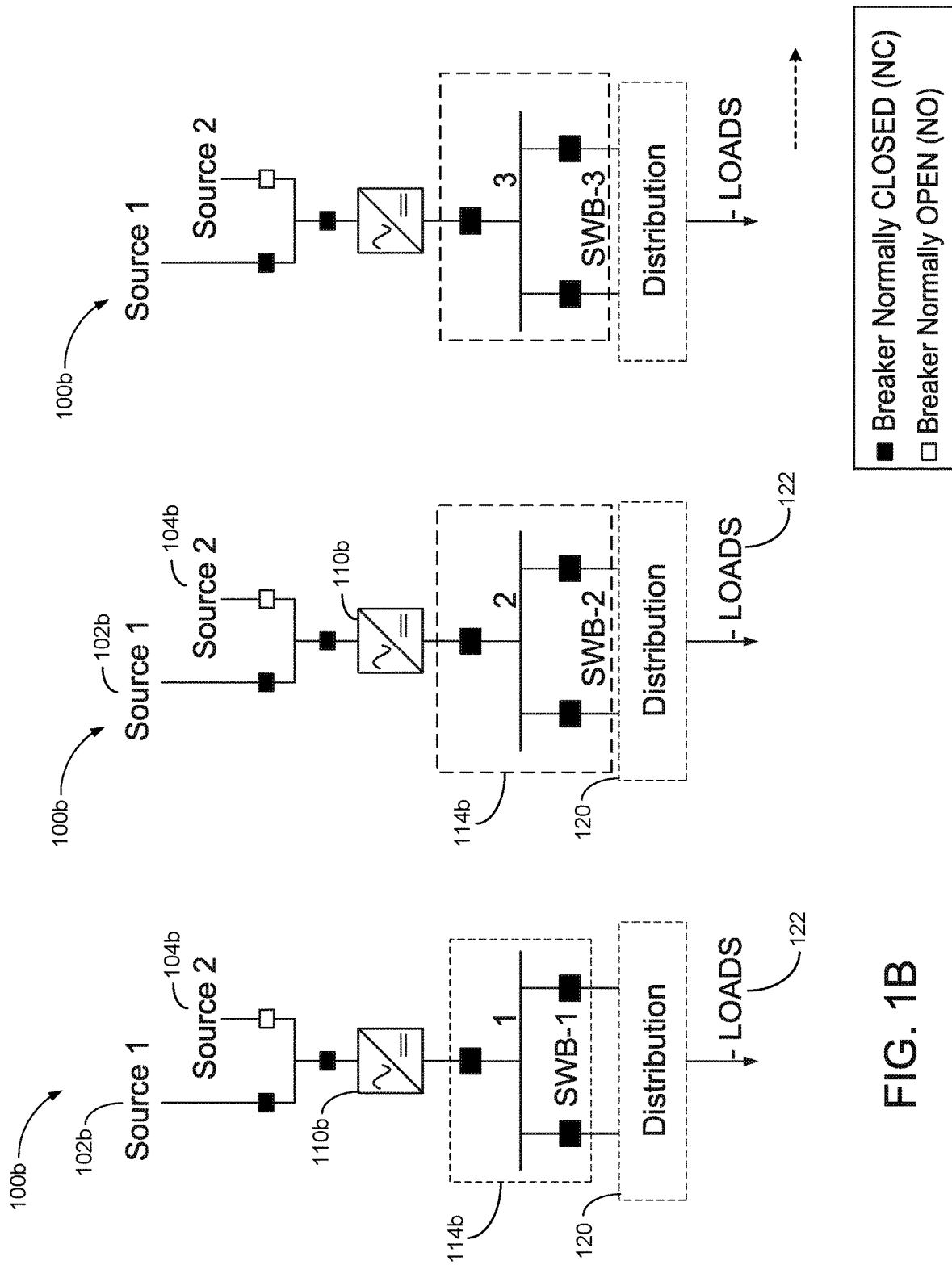

FIGS. 1A and 1B illustrate example open-ring radial DC distribution architectures. As shown in FIG. 1A, an example distribution architecture can include one or more distribution sections 100a. Each distribution section 100a can include at least a first set of source inputs 102a, 104a, and at least a second set of source inputs 106a, 108a. Each source input 102a (source 11), 104a (source 12) in the first set can correspond to distinct power supply sources, and each source input 106a (source 21), 108a (source 22) in the second set can also correspond to the same respective distinct power supply sources. As described in this specification, respective first and second distribution sections (discussed in the various figures) are separate from each other and function independent of each other in various implementations.

In some implementations, source 11 and source 21 can be the same source for each distribution section, while in other implementations, source 11 and 21 can be different sources for each distribution section. Likewise, in some implementations, source 12 and source 22 can be the same source for each distribution section, while in other implementations, respective source 12 and 22 can be different sources for each distribution section. For example, input 102a can correspond to an AC supply signal provided by a first electric sub-station. In contrast, input 104a can correspond to an AC or DC supply signal provided by a first back-up power source. In general, source 11 and source 21 each receive power from different distribution locations or sub-stations, while source 12 and source 22 each receive power from different distribution locations or sub-stations.

Input 106a can correspond to an AC supply signal provided by a second electric sub-station that is distinct from the first electric sub-station. In contrast, input 108a can correspond to an AC or DC supply signal provided by a second back-up power source that is distinct from the first back-up power source. In some implementations, the back-up power source(s) can include one or more back-up power systems that include at least one of a generator system, a battery back-up system, and/or an uninterruptable power supply (UPS).

Section 100a of FIG. 1A includes redundant sets of supply input sources, namely the first set 102a and 104a and the second set 106a and 108a. Thus, section 100a can be described as a dual fed section that receives electric power from two distinct sets of input sources. In contrast, section 100b of FIG. 1B, includes a single set of supply input sources. Thus, section 100b can be described as a single fed section that receives electric power from a single set of input sources. As will be shown described below, a description of section 100a will also correspond to section 100b. However, as section 100a is described, the minor distinctions between sections 100a and 100b will be noted for clarity.

Section 100a of FIG. 1A further includes multiple circuit breakers. In general, circuit breakers are electrical switches designed to protect an electrical circuit from damage that can be caused by an overcurrent event. Like most electrical switches, the breakers of section 100a include a closed position and an opened position. For a given current flow path, at least one breaker along the path can be in a normally closed (NC) switch position to ensure current flows along the path as needed based on system operational requirements. Alternatively, another breaker (e.g., in a parallel circuit path) can be in a normally opened (NO) switch position to inhibit current flow as needed.

In section 100a, for the first and second sets of source inputs, inputs 102a and 106a can be the primary current flow paths and thus, a breaker nearest to the respective source inputs 102a, 106a can be set to NC. Conversely, source inputs 104a and 108a can be the secondary or back-up current flow path and thus, a breaker nearest to the respective source inputs 104a, 108a can be set to NO. Additional breakers along a path common to source inputs 102a, 104a and common to inputs 106a, 108a can also be set to NC to ensure that current flows as required to supply power to each distribution points 120 and loads 122 (e.g., information/computing systems or racks).

FIG. 1A, section 100a further includes a first rectifier 110a disposed along a first current flow path 124a and a second rectifier 112a disposed along a second current flow path 126a. In some implementations, rectifiers 110a and 112a can be conventional rectifier/electrical devices that convert alternating current (AC), which periodically reverses direction, into direct current (DC), which flows in only one direction. Thus, rectifiers 110a, 112a can generally be described as adjusting a characteristic (i.e., converting from AC to DC) of the power signal received at the source inputs. In some alternative implementations, other devices capable of supporting AC to DC conversion may also be installed or disposed within section 100a.

Distribution point 120 represents example distribution/switch breaker units or electrical panels in which conductor cable distribution originates from and extends to the one or more loads 122 that require electric power. In the context of a data center facility, loads 122 can represent, for example, one or more server racks that include a multitude of computing devices that are powered based on the current supplied by source inputs 102a, 104a, 106a, or 108a.

In some implementations, one or more sections 100a can be deployed and installed at a particular location such as facilities including a warehouse, a data center, or a distribution center. The quantity of sections 100a that are deployed can vary based on the electrical power demand for a given facility. Hence, deployment and installation of sections 100a can be scaled upwardly or downwardly in response to increases or decreases in power demands of a given data center.

In section 100a, rectifier 110a is along the current flow path 124a that corresponds to the first set of input sources 102a, 104a, while rectifier 112a is along the current flow path 126a that corresponds to the second set of input sources 106a, 108a. As a distinction, section 100b of FIG. 1B differs from section 100a in that section 100b only includes a single rectifier 110b. The underlying difference between section 100a and section 100b is that the dual fed aspect of section 100a enables that particular distribution section to supply more electric power to downstream loads than the single fed aspect of section 100b.

Each of rectifiers 110a and 110b are coupled or connected to an example power bus 114a that includes one or more NC breakers. Although four NC breakers are shown in FIG. 1A and three NC breakers are shown in FIG. 1B, in various alternative implementations, more or fewer breakers (set to either NC or NO) can be utilized in conjunction with power bus 114a. Distribution points 120 receive adjusted (DC) power signals from power bus 114a and provide a coupling/connecting supply point for loads 122 to receive supply current necessary to power computing devices disposed within, for example, one or more computer or server racks.

Figure 2:
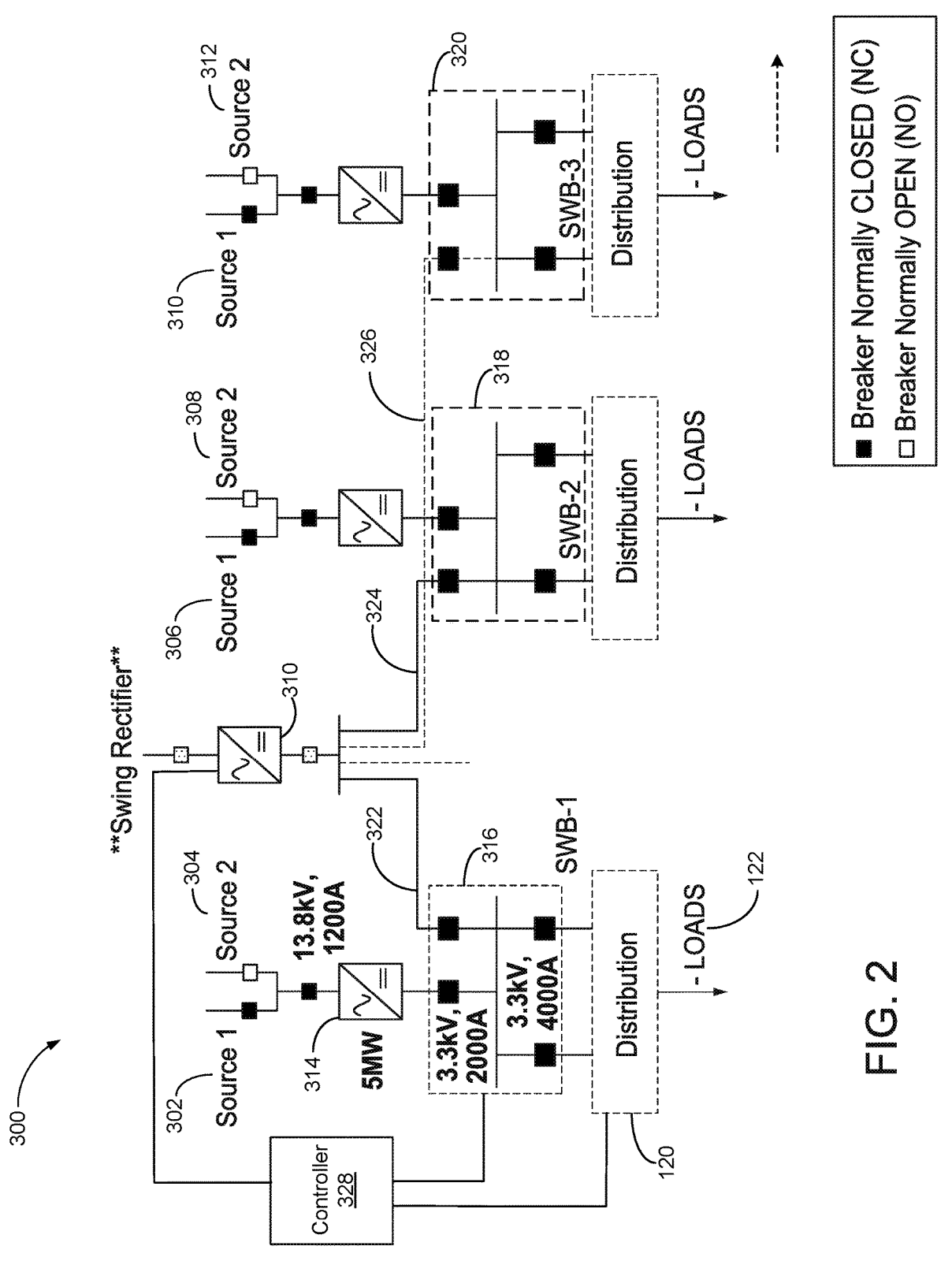

FIG. 2 illustrates an example open ring radial DC distribution architecture including a swing rectifier intermediate a first section and a second section. The hardware arrangement of FIG. 2 is based largely on the hardware arrangement of FIG. 1B. As shown in FIG. 2, the example distribution architecture can include one or more distribution sections 300. Each distribution section 300 can include a set of source inputs 302, 304. Much like FIG. 1B discussed above, each source input 302, 304 of the set can correspond to distinct power supply sources.

The distribution architecture of FIG. 2 enables dynamic distribution of supplemental power to one or more sections 300 through use of swing rectifier 310. In some implementations, swing rectifier 310 receives power from a source input such as source input 302, 304 or another distinct source input. Rectifier 310 can include multiple thyristor units that are configured to enable swing functionality to provide current flow from rectifier 310 to one or more power buses 316, 318, 320. As shown, current flow from rectifier 310 can be provided to power bus 316 via current flow path 322, can be provided to power bus 318 via current flow path 324, and optionally, can be provided to power bus 320 via current flow path 326.

Accordingly, in the distribution architecture of FIG. 2, rectifier 310 can be utilized to dynamically distribute supplemental power to one or more additional loads 122 based on transient or longer-term increases in user demand. In some implementations, rectifier 310 can be connected to an electronic controller 328 that is configured to monitor computing system (e.g., loads 122 or racks) power demands at distribution point 120s and at power buses 316, 318, 320 for a given data center. Although a single connection is shown from controller 328 to distribution point 120 and power bus 316, in some implementations, controller 328 can also be connected to power buses 318 and 320 and the corresponding distribution points 120 that are associated with each power bus 318, 320.

In some implementations, controller 328 monitors adjusted power received by the buses 316, 318 and 320 (and ring bus 414 described below) from their respective rectifier units and provides a control signal to rectifier 310 (and rectifier 410 described below) to cause the distribution of adjusted power that is available to one or more loads. In general, when controller 328 (or a user) detects that the computing system power demands will exceed, or have exceeded, a threshold demand, controller can provide a control signal to rectifier 310 to provide supplemental power to one or more data buses.

The supplemental power from rectifier 310 provides additional output power that can be used by loads 122 to meet increases in power demand. Hence, in some instances, controller 328 enables dynamic adjustment of power available at one or more power buses 316, 318, 320 using rectifier 310. Thus, in one instance, dynamic adjustment of power can include using rectifier 310 to provide power to bus 316 in response to a demand for power exceeding a threshold demand, and using rectifier 310 to provide power to bus 318 in response to the demand for power exceeding a threshold demand.

During operation, and when a power signal is supplied to the distribution architecture of FIG. 2, distribution sections 300 can receive a voltage of 13.8 kV and a current of 1200 A from a particular input source 302, 304. A transformer (not shown) and rectifier 314 can cooperate to adjust/step-down voltage attributes of the power signal to provide a 5 MW power capacity. The 5 MW power is ultimately received by power bus 316 to supply power to one or more downstream loads.

As shown in FIG. 2, loads 122 coupled to power bus 316, through distribution point 120, may have an actual power demand of 3.3 kV at 2000 A (i.e., 6.6 MW) which exceeds the 5 MW power capacity of power bus 316. In this stance, power bus 316 can be described as being in an oversubscribed state because actual power demands exceed the 5 MW output capacity of power bus 316.

In response to this oversubscription at power bus 316 (due to the 5 MW bottleneck), a user, or an example electronic controller 328, can cause rectifier 310 to provide supplemental power via flow path 322 to increase the output power of power bus 316. The supplemental power provided by rectifier 310 causes the output power capacity of bus 316 to be increased to 3.3 kV at 4000 A (i.e., 13.2 MW). Thus, power attributes of power bus 316 can be dynamically adjusted, upscaled or oversized to meet transient or longer-term increases in energy demands and dynamically downscaled or downsized when the increased demand subsides.

Figure 3:
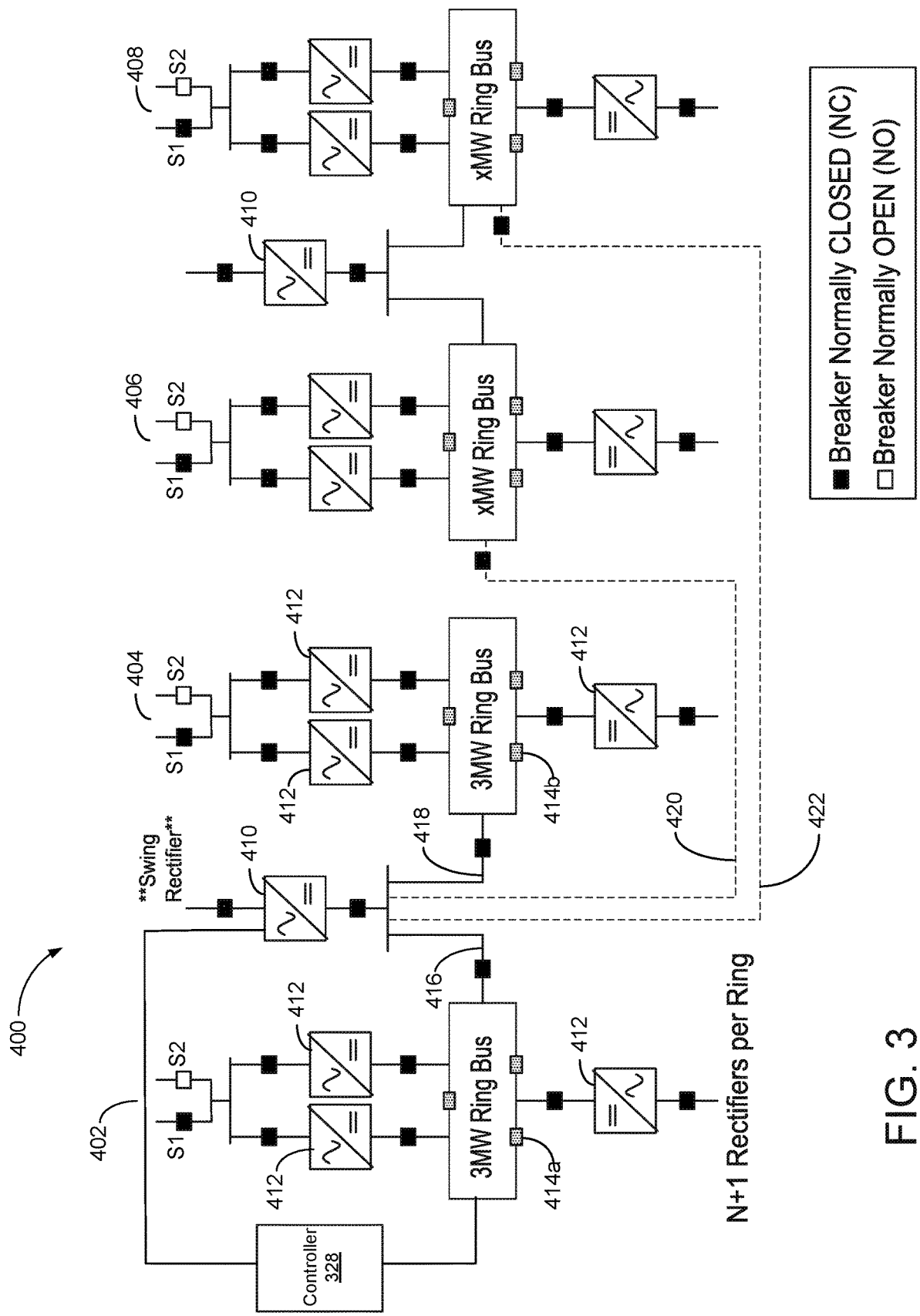
FIG. 3 illustrates multiple example ring bus architectures for DC distribution including a swing rectifier intermediate a first ring bus and a second ring bus.

FIG. 3 illustrates multiple example ring bus architectures for DC distribution including a swing rectifier 410 intermediate a first section 402 having a first ring bus 414a and a second section 402 having a second ring bus 414b. As shown in FIG. 3, each section 402, 404, 406 and 408 can each include a set of source inputs 402 and each source input of the set of source inputs 402 can correspond to distinct power supply sources (S1 and S2). Much like the embodiments of FIG. 2, the distribution architecture of FIG. 3, also enables dynamic distribution and adjustment of supplemental power to one or more sections 400 through use of swing rectifier 410.

FIG. 3 describes an example ring distribution architecture. For ring distribution systems at a given location or facility, distribution begins at source section 402 in which the source inputs (S1 or S2) can be connected to or encircle an area serving one or more distribution points 120 or loads 122. The current carrying conductor of the ring system returns to the same source/section 402. In contrast to the radial distribution design, the loop distribution architecture is typically more expensive to construct than the radial system. However, ring based power distribution architectures typically provide increased reliability when compared to the radial system.

For example, in loop systems, circuit breakers can be used to sectionalize the loop into one more distinct sections such that one section can be serviced or maintained independent of another section. Further, ring based systems can be utilized in facilities or locations in which continuity of service is of considerable importance (e.g., in medical centers).

Accordingly, in a loop or ring bus distribution architecture of FIG. 3, circuit breaker(s) 415 can be utilized to sectionalize ring bus 414a into one or more distinct sections such that a first section can be serviced or maintained independent of a different second section. In the embodiment of FIG. 3, ring bus 414a includes three sections and each section corresponds to, and receives a power signal from, a particular rectifier 412. In alternative implementations, instead of a configuration that includes three rectifiers and three ring bus sections, ring bus 414a/b can each include more or fewer rectifiers 412 and thus more or fewer corresponding sections.

As shown, the distribution architecture of FIG. 3 can include a multiple ring bus arrangement in which rings are interconnected through swing rectifier 410 to facilitate power sharing between one or more rings/sections of the architecture. Swing rectifier 410 can be shared between multiple ring buses 414a/b, and thus facilitates dynamic upscaling (e.g., adjustment) of available DC power that can be supplied by the overall distribution architecture. Moreover, the on-demand interconnection of multiple ring buses 414a/b provides an architecture that can be dynamically scaled as needed to meet changing system power demands.

For example, in some implementations, 3 MW ring bus 414a provides a common bus across multiple rectifiers 412. Section 400 can include three rectifiers 412 that are each sized at 1 MW output power, thus providing a total of 3 MW power capacity per ring bus 414a/b. In some instances, a user or an electronic controller 328 can detect or determine that additional output power is required from ring bus 414a/b based on a monitored power demand exceeding a threshold power demand. Swing rectifier 410 can then receive a control signal to cause the rectifier to provide additional capacity to one or more ring buses 414a/b. As used herein, additional capacity corresponds to a section being able to support additional power demands.

As shown in FIG. 3, going from left to right, current flow from rectifier 410: 1) can be provided to a first ring bus 414a via current flow path 416; 2) can be provided to a second ring bus 414a via current flow path 418; and 3) optionally, can be provided to a third and fourth ring buses 414 via current flow paths 420 and 422, respectively. In some implementations, N+1 rectifier units 412 can be added per ring bus 414a/b to manage power availability on a more granular scale. Thus, additional rectifiers 412 feeding distinct ring sections can be added on-demand to provide additional power that can be supplied by ring bus 414a/b.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An electronic system comprising:
a control device that includes one or more processing devices; and
one or more non-transitory machine-readable storage devices storing instructions that are executable by the one or more processing devices to perform operations comprising:
monitoring, by the control device, power received by a first distribution section, wherein a characteristic of the received power is adjusted by a first rectifier unit coupled to a first power bus of the first distribution section;
monitoring, by the control device, power received by a second distribution section, the second distribution section being separate from the first distribution section, and wherein a characteristic of the received power is adjusted by a second rectifier unit coupled to a second power bus of the second distribution section;
based on a first control signal generated by the control device while monitoring power received by the first distribution section, dynamically adjusting, using a first swing rectifier connected to the first distribution section and to the second distribution section, available power capacity of the first distribution section to power one or more loads; and
based on a second control signal generated by the control device while monitoring power received by the second distribution section, dynamically adjusting, using the first swing rectifier, available power capacity of the second distribution section to power the one or more loads.

2. The electronic system of claim 1, wherein dynamically adjusting available power capacity of the first distribution section comprises:
increasing, using the first swing rectifier, power to the first power bus when a first demand for power exceeds a threshold demand.

3. The electronic system of claim 2, wherein the operations further comprise:
a first switch breaker unit associated with the first power bus and disposed in the first distribution section, and
a second switch breaker unit associated with the second power bus and disposed in the second distribution section,
wherein the first and second switch breaker units each include a power rating that is indicative of a total power output of the respective first and second distribution sections.

4. The electronic system of claim 3, wherein the operations further comprise:
engaging a swing function of the first swing rectifier; and
increasing an amount of available power provided to the one or more loads in response to engaging the swing function of the first swing rectifier.

5. The electronic system of claim 4, wherein the first swing rectifier is coupled to the first and second switch breaker units to enable the provision of available power from the first power bus and from the second power bus.

6. The electronic system of claim 2, wherein dynamically adjusting available power capacity of the second distribution section comprises:
increasing, using the first swing rectifier, power to the second power bus when a second, different demand for power exceeds the threshold demand.

7. The electronic system of claim 1, wherein:
the first distribution section further includes at least one additional rectifier unit that cooperates with the first rectifier unit to form a first ring bus architecture for the first power bus; and
the operations further comprise:
generating, by the control device, a first power adjustment control signal;
distributing, based on the first power adjustment control signal, adjusted power to the one or more loads; and
monitoring adjusted power received by the first ring bus from each of the rectifier units.

8. The electronic system of claim 7, wherein:
the second distribution section further includes at least one additional rectifier unit that cooperates with the second rectifier unit to form a second ring bus architecture for the second power bus; and
the operations further comprise:
generating, by the control device, a second power adjustment control signal;
distributing, based on the second power adjustment control signal, adjusted power to the one or more loads; and
monitoring adjusted power received by the second ring bus from each of the rectifier units.

9. The electronic system of claim 1, wherein the first distribution section and second distribution section are arranged in a radial power distribution architecture to provide power to a plurality of devices disposed within a data center facility.

10. A method comprising:
monitoring, by a control device, power received by a first distribution section, wherein a characteristic of the received power is adjusted by a first rectifier unit coupled to a first power bus of the first distribution section;
monitoring, by the control device, power received by a second distribution section, the second distribution section being separate from the first distribution section, and wherein a characteristic of the received power is adjusted by a second rectifier unit coupled to a second power bus of the second distribution section;
based on a first control signal generated by the control device while monitoring power received by the first distribution section, dynamically adjusting, using a first swing rectifier connected to the first distribution section and to the second distribution section, available power capacity of the first distribution section to power one or more loads; and
based on a second control signal generated by the control device while monitoring power received by the second distribution section, dynamically adjusting, using the first swing rectifier, available power capacity of the second distribution section to power the one or more loads.

11. The method of claim 10, wherein dynamically adjusting available power capacity of the first distribution section comprises:
increasing, using the first swing rectifier, power to the first power bus when a first demand for power exceeds a threshold demand.

12. The method of claim 11, wherein:
a first switch breaker unit is associated with the first power bus and disposed in the first distribution section, and
a second switch breaker unit is associated with the second power bus and disposed in the second distribution section,
wherein the first and second switch breaker units each include a power rating that is indicative of a total power output of the respective first and second distribution sections.

13. The method of claim 12, further comprising:
engaging a swing function of the first swing rectifier; and
increasing an amount of available power provided to the one or more loads in response to engaging the swing function of the first swing rectifier.

14. The method of claim 13, wherein the first swing rectifier is coupled to the first and second switch breaker units to enable the provision of available power from the first power bus and from the second power bus.

15. The method of claim 11, wherein dynamically adjusting available power capacity of the second distribution section comprises:
increasing, using the first swing rectifier, power to the second power bus when a second, different demand for power exceeds the threshold demand.

16. The method of claim 10, wherein:
the first distribution section further includes at least one additional rectifier unit that cooperates with the first rectifier unit to form a first ring bus architecture for the first power bus; and
the method further comprises:
generating, by the control device, a first power adjustment control signal;
distributing, based on the first power adjustment control signal, adjusted power to the one or more loads; and
monitoring adjusted power received by the first ring bus from each of the rectifier units.

17. The method of claim 16, wherein:
the second distribution section further includes at least one additional rectifier unit that cooperates with the second rectifier unit to form a second ring bus architecture for the second power bus; and
the method further comprises:
generating, by the control device, a second power adjustment control signal;
distributing, based on the second power adjustment control signal, adjusted power to the one or more loads; and
monitoring adjusted power received by the second ring bus from each of the rectifier units.

18. The method of claim 10, wherein the first distribution section and second distribution section are arranged in a radial power distribution architecture to provide power to a plurality of devices disposed within a data center facility.

19. One or more non-transitory machine-readable storage devices storing instructions that are executable by the one or more processing devices to perform operations comprising:
monitoring, by a control device, power received by a first distribution section, wherein a characteristic of the received power is adjusted by a first rectifier unit coupled to a first power bus of the first distribution section;
monitoring, by the control device, power received by a second distribution section, the second distribution section being separate from the first distribution section, and wherein a characteristic of the received power is adjusted by a second rectifier unit coupled to a second power bus of the second distribution section;

based on a first control signal generated by the control device while monitoring power received by the first distribution section, dynamically adjusting, using a first swing rectifier connected to the first distribution section and to the second distribution section, available power capacity of the first distribution section to power one or more loads; and based on a second control signal generated by the control device while monitoring power received by the second distribution section, dynamically adjusting, using the first swing rectifier, available power capacity of the second distribution section to power the one or more loads.

20. The one or more non-transitory machine-readable storage devices of claim 19, wherein dynamically adjusting available power capacity of the first distribution section comprises:

increasing, using the first swing rectifier, power to the first power bus when a first demand for power exceeds a threshold demand.

* * * * *